United States Patent [19]

Murch et al.

[11] Patent Number: 5,500,143
[45] Date of Patent: *Mar. 19, 1996

[54] CLEANING COMPOSITIONS FOR PRODUCE

[75] Inventors: Bruce P. Murch, Cincinnati; Brian J. Roselle, Fairfield; Kyle D. Jones, West Chester, all of Ohio

[73] Assignee: The Procter & Gamble Company, Cincinnati, Ohio

[*] Notice: Thye portion of the term of this patent shall not extend beyond the expiration date of Pat. No. 5,498,295.

[21] Appl. No.: 270,707

[22] Filed: Jul. 5, 1994

Related U.S. Application Data

[63] Continuation-in-part of Ser. No. 146,663, Nov. 1, 1993, abandoned, and Ser. No. 224,937, Apr. 8, 1994, abandoned.

[51] Int. Cl.$^6$ .............................. C11D 9/00; C11D 15/00; B08B 9/20
[52] U.S. Cl. ................... 252/108; 252/174.21; 134/25.3
[58] Field of Search ........................... 134/25.3; 252/108, 252/174.21

[56] References Cited

U.S. PATENT DOCUMENTS

| | | | |
|---|---|---|---|
| 4,002,579 | 1/1977 | Mizutani et al. | 252/544 |
| 4,140,649 | 2/1979 | Bossert et al. | 252/105 |
| 4,177,294 | 12/1979 | Lehmann et al. | 426/271 |
| 4,244,975 | 1/1981 | Herbst et al. | 426/271 |
| 4,259,216 | 3/1981 | Miyajima et al. | 252/545 |
| 4,287,102 | 9/1981 | Miyajima et al. | 252/547 |
| 4,414,128 | 11/1983 | Goffinet | 252/111 |
| 4,808,330 | 2/1989 | Chung | 252/170 |
| 5,075,026 | 12/1991 | Loth et al. | 252/122 |
| 5,280,042 | 11/1993 | Lopes . | |
| 5,306,444 | 4/1994 | Kitamura et al. | 252/546 |
| 5,320,772 | 6/1994 | Tricca | 252/160 |

FOREIGN PATENT DOCUMENTS

| | | | |
|---|---|---|---|
| 4023418A1 | 2/1992 | Germany | C11D 3/36 |
| 05262617A | 3/1992 | Japan . | |

OTHER PUBLICATIONS

Code of Federal Regulations, Food and Drugs, § 173.315, "Chemicals used in washing or to assist in the lye peeling of fruits and vegetables" (Apr. 1992).

*Primary Examiner*—E. Rollins Cross
*Assistant Examiner*—Patricia L. Hailey
*Attorney, Agent, or Firm*—Robert B. Aylor; Jerry J. Yetter; Jacobus C. Rasser

[57] ABSTRACT

Basic cleaning compositions using toxicologically-acceptable ingredients for cleaning fruits and vegetables are provided. Clear liquid formulations comprising oleate and polyethylene glycol are applied to apples, lettuce and the like to remove soil and unwanted deposits. The compositions are characterized by their "non-soapy" feel and desirable viscosity profile which allows spray-on compositions to be formulated.

8 Claims, No Drawings

CLEANING COMPOSITIONS FOR PRODUCE

CROSS-REFERENCE TO RELATED APPLICATIONS

This application is a continuation-in-part of our U.S. patent application Ser. No. 08/146,663, filed Nov. 1, 1993, now abandoned, entitled "CLEANING COMPOSITIONS FOR FRUITS AND VEGETABLES", and our U.S. patent application Ser. No. 08/224,937, filed Apr. 8, 1994, now abandoned, entitled "IMPROVED CLEANING COMPOSITIONS FOR FRUITS AND VEGETABLES".

TECHNICAL FIELD

The present invention relates to liquid detersive compositions which are especially suitable for removing dirt and other unwanted residues from fruits and vegetables intended for ingestion by humans or lower animals.

BACKGROUND OF THE INVENTION

It is well-known and appreciated by consumers that fruits and vegetables should be thoroughly washed prior to ingestion in order to remove soils and other unwanted residues which may be undesirably clinging to the surfaces thereof. In addition, some consumers wish to remove the artificial "waxy" coatings which may be applied to some fruits to retard moisture loss for increased storage life and to enhance their appearance. It has been estimated that 95% of consumers recognize the need for thorough washing but, ordinarily, only use tap water for this purpose. On the order of 5% of those consumers who do wash their vegetables use a household cleaner, typically a liquid dishwashing product, to help ensure cleanliness. However, dishwashing products are not specifically intended for such use, inasmuch as they are usually designed to provide high, persistent suds which makes them inconvenient to remove from the fruits or vegetables which have been washed therewith. It will also be appreciated that the formulation of truly effective compositions for washing fruits and vegetables presents a unique problem to the formulator, inasmuch as many art-disclosed cleaning ingredients would, presumably, not be desirable for use in direct contact with foods.

Moreover, it would be desirable to provide effective, toxicologically-acceptable cleaning compositions for fruits and vegetables in the form of low-sudsing, easily rinsable liquid solutions which are water-clear or which have only minimal haziness. Liquid solutions are convenient for the user, since they can be applied directly to soiled fruits and vegetables, followed by rinsing in tap water. The clarity of the liquids connotes cleanliness to the user and is thus highly desirable. Relatively low sudsing is an important attribute so that removal of the solution by rinsing is achieved quickly and easily. It is also of advantage to provide such compositions in the form of stable, low viscosity solutions which can be used in simple pump sprays.

As is well known, many toxicologically-acceptable cleaning ingredients do not meet the aforesaid requirements for clear, low-sudsing, sprayable liquid products. Many detersive surfactants form cloudy or even opaque suspensions in water. Many surfactants are specifically designed to be high sudsing. Still others form relatively high viscosity solutions.

It has now been discovered that certain fatty acids such as oleic acid can be used to provide liquid compositions having the desired properties described above. Unfortunately, when formulated in the desirable basic pH range, such compositions tend to have an undesirable "slick, soapy" feel.

It has now been discovered that certain water-soluble polyethylene glycol (PEG) materials can be used to minimize the undesirably slick, soapy feel of such compositions. Importantly, the PEG materials also unexpectedly reduce the viscosity of the compositions, especially when stored in cold temperatures. Thus, by the practice of this invention, stable, water-clear, low viscosity cleaning compositions having an improved tactile impression can be prepared using safe, food-approved materials.

BACKGROUND ART

The use and selection of cleaning ingredients for the purpose of washing fruits and vegetables is described by the United States Code of Federal Regulations, Title 21, Section 173.315: "Ingredients for use in washing or lye peeling of fruits and vegetables". These regulations restrict the ingredients that may be used for direct contact with food to those described as "generally regarded as safe" (GRAS), and a few other selected ingredients. These sections also provide certain limitations on the amount of material that can be used in a given context.

Among these ingredients, the experienced formulator will find only a few ingredients which can provide effective cleaning of hydrophobic residues, such as waxes, oils, or man-made chemical residues such as pesticides. It is recognized these types of residues are removed most readily by surface active ingredients in water, or by organic solvents largely in the absence of water. Other types of soils, especially particulate insoluble soils that do not readily disperse in water, are effectively removed by surface active materials in water, and aided by complex anionic salts, such as citrates (polycarboxylates), or polyphosphate salts.

Within this limited group of ingredients tile range of effective cleaning compositions well suited to the task of cleaning fruits and vegetables does not appear to have been previously described in the CFR. It is desirable to formulate liquid compositions which are amenable to either direct application to produce, preferably by spray application, or which could be provided in suitable concentrated form to allow convenient dilution to a bowl or sink of water for washing of produce by immersion. Further, it is desirable that the compositions be low sudsing, and easily rinsed, without leaving residue. Preferred compositions should be mild to the hands, especially for direct application.

*Food Chemical News, Inc.*, 1991, p. 334.1, reports that PEG 200–9500 has been cleared under § 178.3750 as a component in articles for use in contact with food (*Fed. Register*, Oct. 15, 1968). Nonetheless, for washing produce, polyethylene glycol should be affirmed as GRAS.

SUMMARY OF THE INVENTION

The present invention encompasses detersive compositions with an improved tactile impression which are especially adapted for cleaning fruits and vegetables, comprising:

(a) at least about 0.75%, preferably from about 1% to about 10%, most preferably from about 2% to about 4%, by weight, of a $C_{12}$–$C_{18}$ fatty acid or salt thereof, (b) at least about 0.05%, preferably from about 0.1% to about 10%, most preferably from about 0.25% to about 3.0%, by weight, of a water-soluble polyethylene glycol having a molecular weight of about 200, or higher;

(c) a water or water-ethanol fluid carrier, said composition having a basic pH. The balance of the composition may comprise various optional adjunct materials, pH-adjusting agents, perfumes or essences, preservatives and the like.

In a preferred mode, component (a) is oleic acid or salt thereof. Also in a preferred mode, component (b) has a molecular weight in the range from about 400 to about 9500.

Typical compositions herein are wherein component (a) is potassium oleate, and wherein the weight ratio of (a):(b) is in the range from about 1:2 to about 15:1.

The compositions are formulated in the base pH range, preferably from about pH 11 to about pH 11.9. Preferred compositions have a viscosity less than about 100 centipoise, preferably less than about 50 centipoise for sprayable compositions.

Below pH about 9.7, the compositions may exhibit some objectionable fatty acid odor. Even at the optimal pH's above 11, some odor may persist. In order to mask this odor, the compositions may contain a perfume or essence ingredient. Especially preferred for this use are terpenes derived from grapefruit.

The invention also encompasses a method for cleaning fruits, vegetables or other produce by applying thereto a composition according to claim 1.

All percentages, ratios and proportions herein are by weight, unless otherwise specified. All documents cited are, in relevant part, incorporated herein by reference.

DETAILED DESCRIPTION OF THE INVENTION

The following toxicologically-acceptable ingredients are used in the preparation of the preferred compositions herein. By "toxicologically-acceptable" is meant that any residues from the ingredients of the compositions which may remain on the fruits or vegetables cleansed therewith are safe for ingestion by humans and lower animals. The ingredients are selected and used in proportions which provide substantially clear compositions.

Fatty Acid—The compositions herein are formulated using $C_{12}$–$C_{18}$ fatty acids. Since the compositions are formulated in the basic pH range, the fatty acids are present in their anionic form. While useful, polyunsaturated fatty acids are not preferred herein, due to odor problems. Saturated fatty acids are also not preferred, since they may have unacceptable odors and may tend to form somewhat hazy solutions.

Oleic acid is quite soluble under basic pH's and sudses optimally. Moreover, only oleate is described as GRAS in the CFR. Accordingly, oleic acid is preferred herein. However, the particular oleic acid that is selected should preferably be low in polyunsaturates, e.g., contain less than about 10%, preferably less than about 7%, more preferably less than about 5% and will typically have an Iodine Value (IV) of from about 70 to about 100, preferably from about 83 to about 95, more preferably from about 85 to about 90. Polyunsaturated fatty acids are not preferred herein, due to odor problems. However, this is primarily from aesthetic considerations since such acids are effective in cleaning. The amount of polyunsaturated fatty acids should be less than about 8%, preferably 0%. The amount of polyunsaturated fatty acids with more than about two double bonds should be less than about 1%, preferably 0%. Saturated fatty acids are normally unacceptable as they have limited solubility for longer chainlength materials ($\geq C_{12}$), or have unacceptable odor ($\leq C_{14}$). For example, stearic and/or tallow fatty acids soaps, even potassium soaps, do not have enough solubility at room temperature, where most produce cleaning is done by individual consumers, to formulate even compositions containing the minimum of about 0.1% soap required for acceptable cleaning. Other specific solubilizing surfactants in higher proportions would be required to solubilize these saturated fatty acids. Pamolyn 100 FGK oleic acid is a good example of a suitable commercial fatty acid.

Polyethylene Glycol—The water-soluble polyethylene glycol polymer (PEG) employed herein is the known article of commerce and is available under a variety of trade names, of which CARBOWAX (Union Carbide Corporation) is exemplary. PEG's in the average molecular weight range of from about 200 to about 20,000 may be used herein, and PEG as CARBOWAX in the average molecular weight range of at least about 400, typically 400 to about 9500, is convenient and preferred. As disclosed above, the compositions herein will comprise at least about 0.05%, by weight, of the PEG and will typically comprise from about 0.1% to about 10%, by weight, of PEG. The amounts used may vary with the molecular weight of the PEG, the amount of oleate or other fatty acid used in the composition, the desired viscosity of the composition, and like factors within the discretion of the formulator. The following Table 1 illustrates the variation in viscosity which can be effected using various levels of PEG and varying PEG molecular weights in a liquid composition (Control) comprising 3% potassium oleate. Table 1 also illustrates the effect of sodium benzoate (Bz) on viscosity.

TABLE 1

| Composition | Viscosity (cP* as made) 72° F. (22° C.) | Viscosity (cP* as made) 43° F. (6° C.) |
| --- | --- | --- |
| Control (no PEG) | 7 | 110 |
| Control + 0.674% Bz | 23 | 1000 |
| Control + 0.118% Bz | 7 | 159 |
| Control + 0.1% PEG 400 | 5 | 36 |
| Control + 0.5% PEG 400 | 2 | 17 |
| Control + 0.1% PEG 8000 | 5 | 23 |
| Control + 0.5% PEG 8000 | 8 | 4 |

*Viscosity in centipoise as measured using Brookfield LVTD #2 spindle, 60 rpm at the designated temperature.

In a typical mode, the preferred compositions herein will comprise oleate: PEG weight ratios in the range from about 1:2 to about 15:1, preferably from about 1:1 to about 10:1.

Base—Toxicologically-acceptable bases can be used in the compositions herein to provide the product pH in the base range, preferably above about pH 9.7, most preferably in the pH range of from about 11 to about 11.9. For ease of formulatability, it is preferred that such bases be in their potassium salt form. Potassium carbonate, potassium bicarbonate and mixtures thereof are convenient and preferred bases for use herein. Potassium carbonate is a preferred basic pH buffer. Sodium bicarbonate is a highly desirable material to add to the compositions of this invention as a part or the buffering system since it is readily available as baking soda in food grade and is therefore relatively inexpensive, while providing a highly desirable purity to the composition. Compositions formulated with a mixture of potassium and sodium cations in molar ratios of from about 1:1 to about 10:1, preferably from about 2:1 to about 8:1, more preferably from about 4:1 to about 5:1 potassium to sodium, e.g., as provided by mixtures of potassium hydroxide (hydrate) and sodium bicarbonate, have desirable theological properties. The compositions are thick, so as to cling to the fruit or vegetable until spread, but are readily dispensed, e.g., by means of a spray device, either aerosol or finger-activated pump. The levels and identities of the ingredients are adjusted to provide products having the desired viscosities as set forth herein, e.g., more than about 5, preferably more than about 10, more preferably more than about 50 centipoise when at rest, and less than about 150, preferably less than about 100, more preferably less than about 50 centipoise under shear of $\geq \sim 1000$ sec$^{-1}$.

In general, the basic pH compositions herein do not require a preservative to prevent the growth of bacteria, fungi, molds, and the like, although one may optionally be added. For example, from about 0.01% to about 0.2% of benzoic acid or its sodium or potassium salts may be used.

Antioxidants. The use of commercial oleate salts, can be complicated by development of off odors and/or yellowing of the compositions in which they appear. These undesirable properties are believed to be caused by complex side reactions initiated by the reaction of oxygen with primarily the polyunsaturated components of the fatty acid stock. These results can be avoided, or minimized, by avoiding contact with air, or by controlling the quality of the fatty acid stock so that the amount and type of polyunsaturates are minimized as described above, and/or by the addition of antioxidants.

It has been found, that the addition of tocopherols (e.g., Vitamin E, or tocopherol acetates) in alkaline formulations is advantageous, as they do not degrade, nor do they impart a strong color. They inhibit the development of off-odors for extended periods of time so that the need for masking scents is minimized, or eliminated, particularly for oleic acid stocks of high quality, as described above. The use of butylated phenols, such as BHT and BHA is also usefill, but their effectiveness appears more limited and they can impart stronger colors to the compositions. Other food grade antioxidants such as Vitamin C and sulfites, are desirable to prevent deterioration of the compositions by the action of oxygen, but care must be taken since vitamin C can suffer color degradation and sulfites can cause odor problems. Sulfites also have been the target of potential health concerns. In acidic formulations, vitamin C can be advantageous since its color degradation is less severe.

Citrate—The citric acid optionally used in the compositions herein is the standard item of commerce. The citrate improves the water-clear character of the product. When formulating under basic conditions, it is preferred to use the potassium citrate salt (or to neutralize citric acid with KOH) as compared with sodium citrate, to provide ease of formulatability. Complex phosphates can also be used. Other organic poly carboxylic acids, especially those that are GRAS, such as tartaric, malic, etc. acids, can also be used.

Optional Surfactants—Optionally, other base-stable surfactants may be employed, as allowed by the United States Code of Federal Regulations, Title 21, Section 173.315. Preferred are salts of dodecylbenzene sulfonate, typically at levels up to about 0.2%. Also described in the CFR are phosphate esters of ethylene and/or ethylene/propylene oxide adducts of aliphatic alcohols, dioctyl sulfosuccinate, or 2-ethylhexyl sulfate, but these materials may suffer from some lack of stability under basic conditions.

Fluid Carrier—The major proportion (typically, 90%–98%, by weight) of the compositions herein comprises water or water-ethanol as the solubilizing carrier for the ingredients. As noted in the Examples hereinafter, water-ethanol is especially preferred when formulating basic pH compositions. Ethanol should not exceed 2%- 3% if the formulator wishes to avoid alcohol odor when used in a product designed for spray-on usage. The ethanol level preferably should not exceed 2% in the solution used to clean the produce, to avoid an alcoholic odor, especially when spraying. Other compatible, water-soluble, low molecular weight solvents such as glycerol can also be used.

Perfume—The compositions herein may optionally comprise a perfume or essence material, typically at levels from about 0.01% to about 0.1%, by weight. Any perfume may be employed, and typical examples include lemon oils, lime oils, orange oils and the like. It transpires that grapefruit oil terpenes are particularly useful herein, both to mask residual fatty acid odors and since the grapefruit odor is desirably non-distinct in the finished product, as compared with lemon or lime oils. Thus, the user is confident that no extraneous lemon or lime flavors are being imparted to the fruits or vegetables which are being cleansed.

Tactile Impression—The compositions herein are characterized not only by their excellent cleaning performance and sudsing/rinsability properties, but also by their improved viscosity properties and improved "feel". While, as disclosed above, the improved viscosities of the compositions herein are readily demonstrated quantitatively using standard measurement techniques, the improved feel of the compositions which come into contact with the users' hands is a qualitative tactile impression. However, this improved, "non-slippery", "non-soapy" improvement in skin feel can be demonstrated by rubbing Test (PEG-containing) and Control (no PEG) compositions on tile hands or inner forearms of volunteer graders. Even in such rudimentary tests, tile graders can readily distinguish the improved tactile impression of the compositions made in accordance with this invention.

The compositions herein are preferably used by placing them in a package comprising either an aerosol container or a non-aerosol spray device "spray means." Said spray means is any of the manually activated, preferably "trigger-type," means for producing a spray of liquid droplets as is known in the art. Typical spray means are disclosed in U.S. Pat. Nos. 4,082,223, Nozawa, issued Apr. 4, 1978; 4,161,288, McKinney, issued Jul. 17, 1979; 4,558,821, Tada et al., issued Dec. 17, 1985; 4,434,917, Saito et al., issued Mar. 6, 1984; and 4,819,835, Tasaki, issued Apr. 11, 1989, all of said patents being incorporated herein by reference. The spray bottle, or container can be any of the ones commonly used for containing hard surface cleaner detergent compositions. Examples of bottles are those in U.S. Design Pat. Nos.: 244,991, Weekman et al., issued Jul. 12, 1977; and 275,078, Wassergord et al., issued Aug. 14, 1984, said patents being incorporated herein by reference.

The spray means herein can also include those that incorporate a propellant gas into the liquid and those that will foam even detergent compositions having a viscosity of less than about 15 cps. The device can also be one that can be adjusted to either give a liquid spray or a foam. The spray means herein are typically those that act upon a discrete amount of the composition itself, typically by means of a piston that displaces the composition and expels the composition through a nozzle to create a spray of thin liquid.

Preferred articles include the compositions herein that are suitable for use in the processes described herein, in a package that can provide a spray. Such articles are not widely marketed. This is surprising in view of the clear advantages for such products for use by individual consumers. The typical use involves treating individual items of produce, which would make preparation of a "bath" wasteful.

In a preferred process for using the products described herein, and especially those formulated to be used at full strength, the product is sprayed onto the food product to be cleaned, rubbed, rinsed and/or wiped off with a suitable material like cloth, sponge, a paper towel, etc. Surprisingly, the compositions and processes described herein, especially those that are alkaline, can provide effective disinfectancy.

All parts, percentages, and ratios herein are "by weight" unless otherwise stated. All number values are approximate unless otherwise stated.

The following Examples illustrate the practice of this invention, but are not intended to be limiting thereof. The exemplified liquid compositions can be prepared at pH 11.1–11.9 by dissolving the ingredients in water or water-ethanol using conventional mixing apparatus. In a convenient mode, water is placed in a mixing vessel. Potassium hydroxide, citric acid, the bicarbonate, glycerine (processing aid) and ethanol are added in the named sequence, with stirring. The oleic acid is added with high shear and stirring is continued. The PEG (which may conveniently be predispersed in water) is then added. The optional perfume ingredients can be added any time after the oleic acid has been dissolved in the mixture.

EXAMPLE I

Liquid compositions suitable for direct application to fruits and vegetables, including by spray-on, are as follows:

| | % (wt.) | |
|---|---|---|
| Ingredient | Composition A | Composition B |
| Oleic Acid | 2.64* | 1.32 |
| Ethanol | 2.0 | 2.0 |
| Glycerol | 2.0 | 2.0 |
| PEG (avg. mol. wt.) | 0.5 (4600) | 1.5 (8000) |
| KOH | 1.49 | 1.23 |
| KHCO$_3$ | 0.65 | 0.65 |
| Citric Acid | 6.63 | 0.63 |
| Oil Grapefruit Terpenes EX-5-fold | 0.04 | 0.02 |
| Water | Balance | Balance |

*Corresponds to 3% potassium oleate.

In-use, the compositions are applied directly to soiled fruits and vegetables such as apples, lettuce, asparagus, broccoli, endive and the like, with light scrubbing as may be required. After rinsing in tap water, the fruits and vegetables are ready for use. The waxy materials commonly used to produce a sheen on apples may also be removed by application of the compositions.

If desired, the compositions of Example I may be concentrated up to about 5-fold by removal of a corresponding amount of water-ethanol solvent. The concentrates are preferably diluted back to correspond to 3%–5% potassium oleate prior to use in an immersion or spray-on cleaning operation.

What is claimed is:

1. A detersive composition with an improved tactile impression for fruits and vegetables, comprising:

(a) at least about 0.75%, by weight, of a $C_{12}$–$C_{18}$ fatty acid or salt thereof;

(b) at least about 0.05%, by weight, of a water-soluble polyethylene glycol having a molecular weight of about 200, or higher, to provide reduced viscosity and to minimize the slick, soapy feel of the composition;

(c) from about 90% to about 98% of water or water-ethanol fluid carrier, said composition having a basic pH between about 11 and about 11.9.

2. A composition according to claim 1 wherein component (a) is oleic acid or salt thereof.

3. A composition according to claim 1 wherein component (b) has a molecular weight in the range from about 400 to about 9500.

4. A composition according to claim 3 wherein component (a) is potassium oleate, and wherein the weight ratio of (a):(b) is in the range from about 1:2 to about 15:1.

5. A composition according to claim 1 which has a viscosity less than about 100 centipoise.

6. A composition according to claim 1 which has a viscosity less than about 50 centipoise and is sprayable.

7. A composition according to claim 1 which additionally comprises terpenes derived from grapefruit.

8. A method for cleaning fruits and vegetables comprising the step of applying thereto a composition according to claim 1.

* * * * *